April 2, 1929.  W. C. RASTETTER  1,707,769
FOLDING CHAIR
Filed May 25, 1925
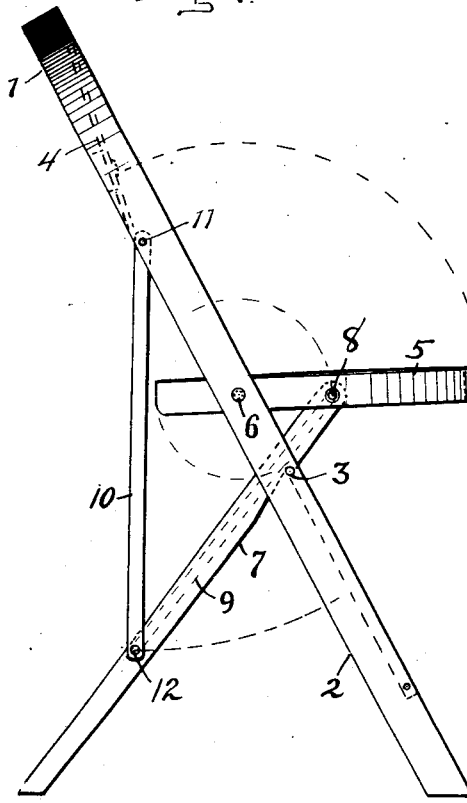
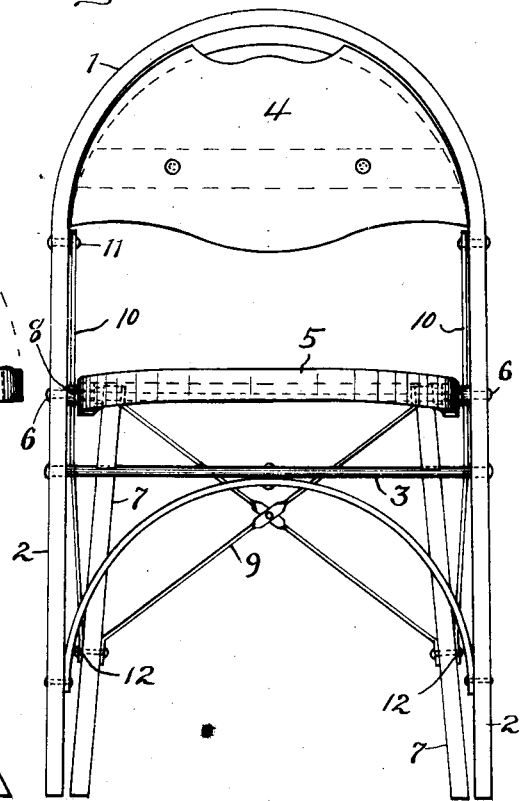
William C. Rastetter INVENTOR
BY
A. G. Burns ATTORNEY Patented Apr. 2, 1929.

1,707,769

UNITED STATES PATENT OFFICE.

WILLIAM C. RASTETTER, OF FORT WAYNE, INDIANA.

FOLDING CHAIR.

Application filed May 25, 1925. Serial No. 32,574.

This invention relates to improvements in folding chairs, and the object thereof is to provide a chair, all of the folding parts of which are secured together by simple pivotal connections so that the rubbing together of such parts as is usual where sliding connections are employed is obviated.

This object is accomplished by the construction illustrated in the accompanying drawings, in which:—

Fig. 1 is a side elevation of a structure embodying the invention; and

Fig. 2 is a front elevation projected from Fig. 1.

The characters appearing in the description refer to parts shown in the drawings and designated thereon by corresponding characters.

The invention comprises a frame 1 including spaced legs 2 connected together by a cross brace 3, and supporting in its upper part a back-rest 4. A tilting seat 5 has a pivotal connection 6 at each side thereof with the corresponding leg 2, and a pair of folding rear legs 7 have pivotal connection at their respective upper ends with said seat upon a transverse rod 8 therein at a point between the front end of the seat and its pivotal connections 6. Also, the folding rear legs 7 are connected together by a brace member 9. The legs 7, being positioned within the seat-frame 5, are movable without interference into folded position in the frame between the pivotal connections 6 for the seat-frame and legs 2, thus all of the folded members lie within the front and back planes of the frame 1. A pair of arms 10 are connected respectively at their upper ends in the frame upon corresponding pivots 11 at a point therein above the seat, and are connected at their respective lower ends with the rear legs 7 by corresponding pivots 12. The rear legs 7 have each a shoulder 7' that has bearing engagement with the cross-brace 3 when the seat and the rear legs are in extended position for use, and the swinging movement of the rear legs is limited.

In utilizing the invention the chair is folded by tilting the seat upwardly upon its pivotal supports 6 until the seat is moved into the front of the frame. As the seat is thus drawn upwardly the rear legs attached thereto and the arms attached to the rear legs are accordingly drawn into the frame, so that the seat, rear legs and arms are disposed in a plane substantially common with that of the frame.

As the connections between the seat and the frame, and the connections between the various movable parts of the structure are pivotal, the chair may be folded or extended for use with a minimum frictional resistance at the joints and thus the chair may be readily and noiselessly manipulated, and also because all of the connections are pivoted, scuffing by rubbing together of the various movable parts is obviated.

What I claim is:—

1. In a folding chair, a frame including a pair of legs spaced apart; a seat having a frame each side of which has pivotal connection with the corresponding leg; a pair of folding rear legs pivotally connected respectively at their upper ends to said seat between the sides thereof; a pair of arms having pivotal connections respectively at their upper ends in said first frame at points therein above said seat, and at their lower ends with the corresponding rear legs; and a cross-brace connecting the legs of said first frame at a point therein beneath the seat and being operative to limit the unfolding movement of the chair by engagement with said rear legs.

2. In a folding chair, a frame having side members spaced apart and forming the front legs of the chair; a folding seat having a frame the sides of which are pivoted respectively to the corresponding side members, a pair of swinging arms pivoted in the first frame; a pair of folding rear legs having pivotal connections with said seat within the sides thereof, and also with said arms and being foldable into the plane of said seat; and means fixed in said first frame operable as a stop for limiting the unfolding movement of the chair by engagement with said rear legs.

3. In a folding chair, a frame having side members constituting forelegs; a cross-brace connecting said forelegs; a U-shaped seat-frame, the rear end of which is open, the sides of which seat-frame are each pivotally connected with a corresponding foreleg; a seat disposed upon the top of said seat-frame; a movable rear leg structure, the legs of which extend between the sides of the seat-frame and are pivotally connected to the corresponding sides thereof, and are foldable between said sides and extend through the open end of said frame when the chair is folded, there being a shoulder formed in the front face of each leg of said rear leg structure, that has bearing relation with said cross-brace when the seat is in position for use; and a pair of swinging arms pivoted at their upper ends in said first frame and at their lower ends to said rear leg structure, the folding members of said chair being movable into the plane of said first frame.

In testimony whereof I affix my signature.

WILLIAM C. RASTETTER.